(12) United States Patent
Zank et al.

(10) Patent No.: US 7,526,108 B2
(45) Date of Patent: Apr. 28, 2009

(54) WIRELESS DATA MANAGEMENT SYSTEM

(75) Inventors: Anthony E. Zank, Simi Valley, CA (US); Thomas M. Jacques, Santa Paula, CA (US)

(73) Assignee: Topaz Systems, Inc., Simi Valley, CA (US)

( * ) Notice: Subject to any disclaimer, the term of this patent is extended or adjusted under 35 U.S.C. 154(b) by 813 days.

(21) Appl. No.: 10/777,290

(22) Filed: Feb. 11, 2004

(65) Prior Publication Data

US 2004/0223660 A1 Nov. 11, 2004

Related U.S. Application Data

(63) Continuation-in-part of application No. 10/365,575, filed on Feb. 11, 2003, now Pat. No. 7,123,143.

(51) Int. Cl.
*G06K 9/00* (2006.01)

(52) U.S. Cl. .............. 382/119; 382/124; 382/305; 455/67.11; 370/335; 340/539.13

(58) Field of Classification Search .......... 382/119, 382/124, 125, 305; 455/562.1, 67.14, 69, 455/517, 466, 67.11, 423, 522; 235/380, 235/375, 381, 376, 383; 370/310, 329, 342, 370/328, 277, 343, 442, 335; 340/539.21, 340/539.1, 539.13

See application file for complete search history.

(56) References Cited

U.S. PATENT DOCUMENTS

| 5,892,824 | A * | 4/1999 | Beatson et al. ............... 713/186 |
| 6,307,955 | B1 * | 10/2001 | Zank et al. .................. 382/121 |
| 6,539,101 | B1 * | 3/2003 | Black ......................... 382/124 |
| 6,622,014 | B1 * | 9/2003 | Daniel ........................ 455/411 |
| 6,940,403 | B2 | 9/2005 | Kail, IV |
| 6,970,584 | B2 * | 11/2005 | O'Gorman et al. .......... 382/126 |
| 2003/0001459 | A1 * | 1/2003 | Scott .......................... 310/339 |
| 2004/0156536 | A1 * | 8/2004 | Zank et al. .................. 382/119 |

OTHER PUBLICATIONS

Notice of Allowance and Fee(s) Due mailed Jun. 23, 2006 U.S. Appl. No. 10/365,575, filed Feb. 11, 2003.

Office Action mailed Apr. 27, 2006 U.S. Appl. No. 10/365,575, filed Feb. 11, 2003.

* cited by examiner

*Primary Examiner*—Sheela C Chawan
(74) *Attorney, Agent, or Firm*—Jeffrey G. Sheldon; Michael Fedrick

(57) ABSTRACT

A portable electronic data management and transport system includes a base unit and a wireless remote unit. The wireless remote unit can incorporate a graphic tablet digitizer for signaling signature data to a personal computer.

20 Claims, 7 Drawing Sheets

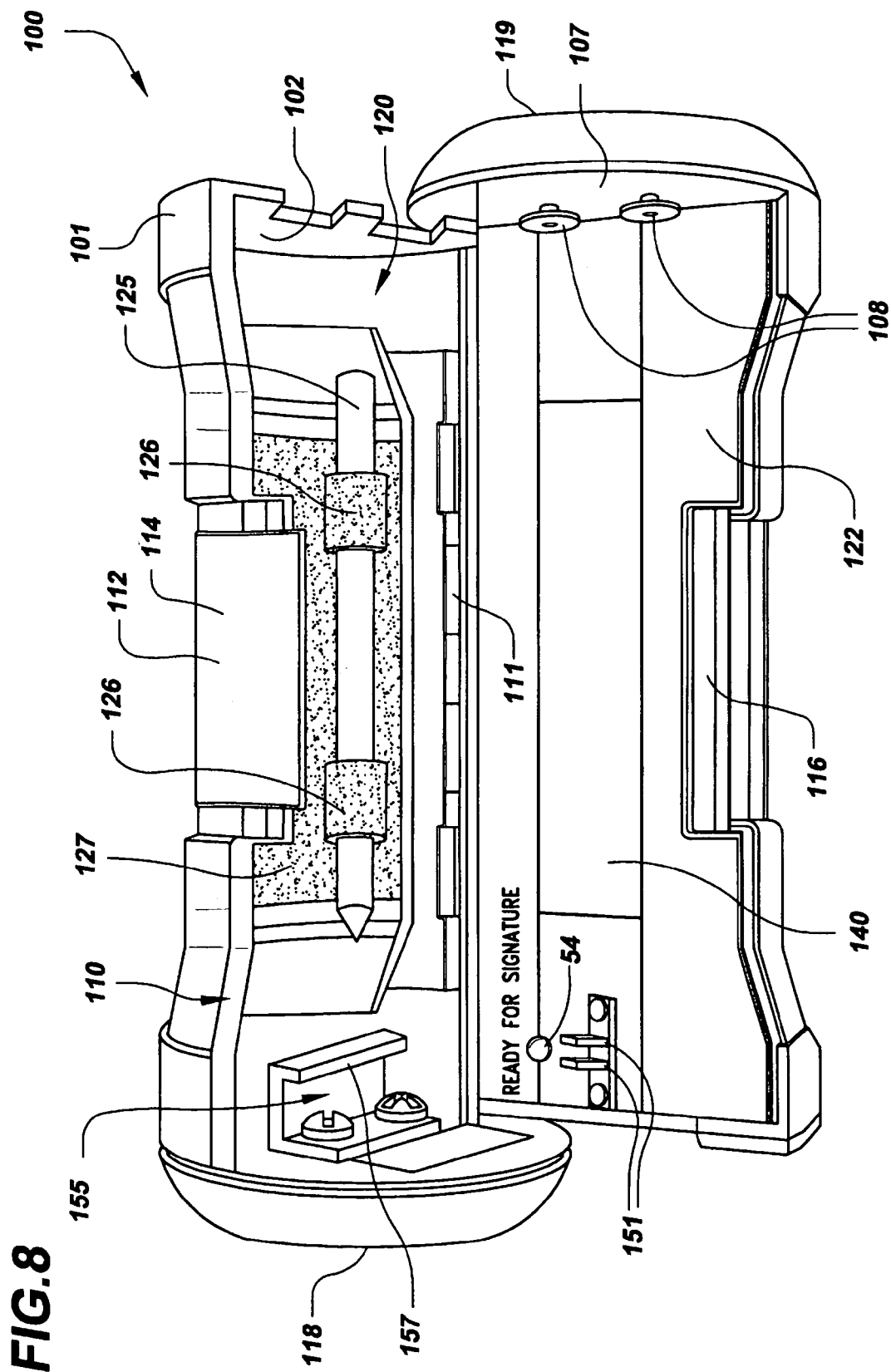

WIRELESS DATA MANAGEMENT SYSTEM

This. patent application is a continuation-in-part of U.S. patent application Ser. No. 10/365,575, filed on Feb. 11, 2003 now U.S. Pat. No. 7,123,143 the disclosure of which is hereby incorporated by reference.

BACKGROUND

The present invention relates to data management, and in particular to the utilization of handwritten signatures in connection with commercial transactions.

Handwritten signatures continue to be the basis of many contracts in commerce, such signatures traditionally being on paper documents that set forth terms of transactions; recently, however, there is increasing use of signature tablets by which the signatures are recorded and verified electronically, using so-called e-signature technology. See, for example, U.S. Pat. No. 6,307,955 to Zank et al., which is incorporated herein by this reference. Many point-of-sale terminals now have electronic signature tablets associated therewith, a typical tablet being fixedly mounted a short distance from the terminal proper and connected to a personal computer (PC) of the terminal by a multiple conductor interface cable.

With the increasing popularity and usage of e-signature technology comes the challenge of providing an e-signature tablet that can be used in environments where a standard tablet with a hard connection to a PC is just not practical. One such environment is the drive-up teller window. With a standard tablet, the full conversion of such a facility to e-signature technology does not seem possible. Any kind of a device with a cable at the drive-up window is definitely a safety concern, and anything hard-mounted to the kiosk, so that an individual needs to lean out, is very awkward and not accessible to the handicapped. On the other hand, a wireless connection invites theft or inadvertent transport of the signature tablet from the terminal facility.

Thus there is a need for a portable electronic signature system that is effective, reliable, and easy to use, yet is reasonably secure from theft or inadvertent removal, and that otherwise overcomes the disadvantages of the prior art.

SUMMARY

The present invention meets this need by providing, inter alia, a wireless e-signature tablet that activates base unit and customer alarms in the event that the tablet is transported more than a predetermined distance from the base unit. In one aspect of the invention, a wireless electronic signature management system includes a base unit having a base controller and a wireless base transceiver, the base unit further including a base alarm circuit interfaced to the base controller, a remote unit including a remote controller, a wireless remote transceiver, a signature tablet for receiving a handwritten signature from a user, means for temporarily storing signature data corresponding to the signature in one or both of the remote controller and the signature tablet, and a remote alarm circuit interfaced to the remote controller. The respective transceivers are operative for bidirectional communication between the base controller and the remote controller within a limited range, the base controller being operative for activating the base alarm circuit in response to a defined interruption of communication from the remote unit. The system further includes a means for communicating the signature data from the remote unit to the base unit, the remote controller being operative for activating the remote alarm circuit in response to a defined interruption of communication from the base unit.

The base controller can be implemented for activating the base transceiver to transmit trigger signals that have a first characteristic in response to identification signals being received from the remote transceiver, and a second characteristic in response to non-receipt of the identification signals from the remote transceiver. The remote controller can be implemented for activating the remote transceiver to transmit the identification signals in response to receipt of the trigger signals by the remote transceiver. The transmission of the trigger signals can be periodic, and the remote controller can be implemented for activating transmission of an identification signal in response to each received trigger signal.

Preferably, the remote unit has a standby mode in which the remote transceiver is activated only during spaced intervals for reduced power consumption by the remote unit. The remote unit can be provided with a storage compartment having an access door for receiving objects to be transported, and a sensor for signaling a closed condition of the door, and the standby mode can be activated in response to closure of the door. The standby mode can be exited in response to opening of the door. Also, or in the alternative, the standby mode can be activated in response to completion of a signature capture by the signature tablet. Further, the completion of the signature capture can be indicated by closure of the door.

The means for communicating the signature can include means for activating the remote transceiver to transmit the signature to the base transceiver. The means for activating the remote transceiver to transmit the signature can include means for activating the base transmitter to transmit a download command, and means in the remote unit for recognizing the download command.

Also, or in the alternative, the means for communicating the signature can include a docking device for coupling to the remote unit, the docking device being in communication with to the base unit and providing communication between the remote unit and the base unit, the remote unit being configured for communicating signature data via the docking device.

In another aspect of the invention, a method for managing transmission of electronic signatures between a transportable device and a transaction facility includes:

(a) providing a base facility in association with the transaction facility, comprising a base computer having a base transceiver interfaced therewith;

(b) providing a remote unit associated with the transportable device, comprising a remote computer having a remote transceiver interfaced therewith;

(c) activating the base transceiver to transmit trigger signals;

(d) activating the remote transceiver to transmit identification signals;

(e) activating the base transceiver for receiving the identification signals;

(f) activating the remote transceiver for receiving the trigger signals;

(g) activating a remote alarm at the remote unit in response to a defined interruption of communication from the base unit;

(h) activating a base alarm at the base unit in response to a defined interruption of communication from the remote unit;

(i) deactivating the remote alarm and the base alarm in response to restoration of communication between the base and remote units;

(j) capturing a handwritten signature as digital signature data at the remote unit; and (k) transmitting the signature data to the base unit.

The method can also include altering the trigger signals depending on receipt of valid identification signals at the base unit, wherein the defined interruption of communication from the base unit comprises the alteration of the trigger signals.

In another aspect, the invention provides a canister for use in a mechanical transport system, the canister including a housing defining a compartment for receiving items to be transported; a controller; a wireless transceiver for communicating with a base facility, the transceiver being operative for bidirectional communication between the controller and the base facility within a limited range; and an alarm circuit interfaced to the controller, the controller being operative for activating the alarm circuit in response to a defined interruption of communication from the base unit, and deactivating the alarm circuit in response to a defined restoration of the communication from the base unit. The controller can be operative for activating the transceiver to transmit identification signals to the base facility when the canister is within the limited range. The controller can also be operative for activating the transceiver to transmit the identification signals in response to receipt of trigger signals from the base facility by the transceiver. The trigger signals can have a first characteristic when identification signals are being received by the base facility and a second characteristic when the identification signals are not being received by the base facility, the defined interruption of communication comprising, during a predefined period of time non-receipt of the trigger signals, or receipt of trigger signals having the second characteristic. Further, or in the alternative, the controller can be operative to activate transmission of an identification signal in response to each received trigger signal.

Preferably the controller has a standby mode wherein the transceiver is activated only during spaced intervals for reduced power consumption. The canister can also include an access door for the compartment, and a sensor for signaling a closed condition of the door, wherein the standby mode is activated in response to closure of the door. The standby mode can be exited in response to opening of the door.

In a further aspect, the invention provides the combination of a canister having a housing defining a compartment for receiving items to be transported in a mechanical transport system; a wireless alarm that includes a base unit having a base controller with a wireless base transceiver and a base alarm circuit interfaced to the base controller; and a remote unit of the canister, including a remote controller with a wireless remote transceiver and a remote alarm circuit interfaced to the remote controller, the respective transceivers being operative for bidirectional communication between the base controller and the remote controller within a limited range, the base controller being operative for activating the base alarm circuit in response to a defined interruption of communication from the remote unit, and the remote controller being operative for activating the remote alarm circuit in response to a defined interruption of communication from the base unit. The base controller can be operative for activating the base transceiver to transmit the trigger signals having the first and second characteristics that depend on whether the identification signals are being received; the identification signals can be transmitted in response to receipt of the trigger signals by the remote transceiver; and transmission of the trigger signals can be periodic. Also, or in the alternative, the remote controller can activate transmission of an identification signal in response to each received trigger signal.

Preferably the remote unit has the standby mode for reduced power consumption by the remote unit. The canister can also include an access door for the storage compartment, and a sensor for signaling a closed condition of the door, the standby mode being activated in response to closure of the door. Also, the standby mode can be exited in response to opening of the door.

The combination can further include means for transmitting transaction data between the canister and the base unit. The means for transmitting transaction data can include means for activating the remote transceiver to transmit the data to the base transceiver, and the means for activating the remote transceiver can include the means for activating the base transmitter to transmit the download command, and the means in the remote unit for recognizing the download command. Alternatively, or in addition, the means for communicating the transaction data can include the docking device that is electrically connected to the base unit, the remote unit being configured for electrically coupling the data through the docking device.

DRAWINGS

These and other features, aspects, and advantages of the present invention will become better understood with reference to the following description, appended claims, and accompanying drawings, where:

FIG. 8 is a side view showing another embodiment of the transport housing of the present invention in an open position.

DESCRIPTION

Figure 1:
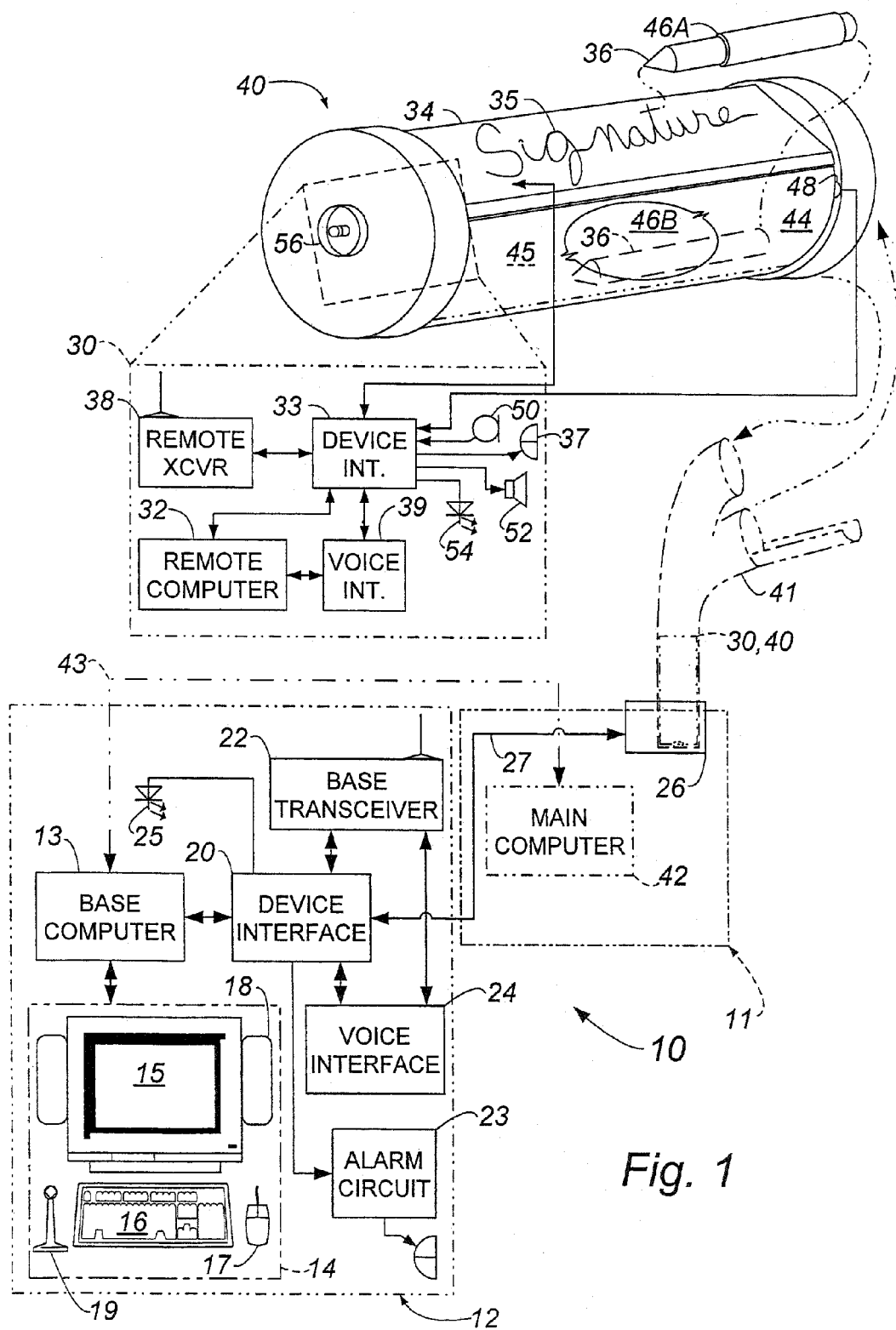
FIG. 1 is a pictorial block diagram of a portable electronic signature management system according to the present invention.

The present invention is directed to a portable computer-based data management and transport system that is particularly effective, reliable, and resistant to removal of wireless-connected portions thereof. With reference to FIGS. 1-4 of the drawings, a wireless signature system 10 for use in association with a transaction facility 111 includes a base unit 12 having a base computer 13, an operator interface 14 including a screen display 15, a keyboard 16, a pointing device or mouse 17 and, optionally, a pair of base speakers 18 and a base microphone 19. It will be understood that a single base speaker 18 can be employed and that headphones can be substituted, optionally with an included microphone. The base unit 12 also includes a base device interface 20 that is suitably connected to a base indicator (described below), a base transceiver 22, and a base alarm circuit 23 which can include a buzzer and/or a signal output to an external device (not shown). The base unit also includes a base voice interface 24 that is connected to the base transceiver 22 for enabling digital transmissions of analog voice waveforms, and a base indicator 25 for indicating an alarm condition as further described below. Typically, the voice interface is also connected to the base device interface 20 for coupling voice communications via the base transceiver 22 from the base microphone 19 and to the base speakers 18. Alternatively, the coupling can be from and to respective microphone and speakers of the transaction facility 11, the speakers 18 and microphone 19 of the user interface 14, if present, not being used for communication via the base transceiver 22.

The system 10 also includes a remote unit 30 having a remote computer 32 and a remote interface 33 that is suitably connected to a signature tablet 34 for capturing a handwritten signature 35 using a stylus 36, a remote alarm circuit 37, a remote transceiver 38 and, optionally, a remote voice interface 39.

According to the present invention, the remote unit 30 is implemented for repetitively transmitting an identification signal that is recognized by the base unit 12 when the remote unit 30 is not more than a predetermined distance from the base unit 12. Typically, the predetermined distance is a distance beyond which the identification signal is not recognizable by the base unit. Similarly, the base unit 12 repetitively transmits a trigger signal that is recognizable by the remote unit 30 when the remote unit is within the predetermined distance from the base unit. When this bidirectional communication is interrupted in the case of the remote unit being transported out of range, alarms are activated in both the base unit 12 and the remote unit 30 in one embodiment. In a preferred exemplary configuration of the system 10, transmission of the identification signal from the remote unit is in response to a periodic trigger signal from the base unit, the form of the trigger signal being dependent on whether the identification signal is being recognized at the base unit 12. For example, a test bit of the trigger signal can be toggled on or off depending on whether the identification signal is properly received. The toggling can be to alternate states in each cycle for facilitating verification of valid communication based on changed states of the test bit. The test bit can then be reflected back to the base unit as an element of the identification signal for base unit verification of bidirectional communication.

The remote unit 30 is also implemented for transmitting signature data such as pen position coordinate data to the base unit 12 in a suitable manner as described, for example, in the above-referenced '955 patent. The remote computer 32 and/or the signature tablet 34 preferably has suitable memory associated therewith for temporarily storing signature data, at least during intervals of time that the remote unit 30 is out of range from the base unit 12. Transceivers suitable for use as the base transceiver 22 and the remote transceiver 38 are available as Part No. AC5124C from Aerocomm of Lenexa, Kans.

In the exemplary configuration shown in FIG. 1, the remote unit 30 is installed with the signature tablet 34 in a transportable canister 40 that is configured for use in the transaction facility 11, the facility 11 also including a vacuum transport tube 41 and, optionally, a main computer 42, the main computer 42 preferably having a communication link 43 to the base computer 13. The canister 40 has a conventional door 44 that opens an interior compartment 45, the compartment being used for carrying documents between users (typically customers) and the transaction facility 11, and for storing the stylus 36. Preferably the compartment 15 and the stylus 16 have complementary elements 46A and 46B of a retainer such as a hook-loop fastener affixed thereto for releasably capturing the stylus 36 when it is not in use. Preferably the canister 40 incorporates a door sensor 48 for signaling whether the door 44 is open or closed.

In the exemplary configuration shown in FIG. 1, the remote unit 30 is installed with the signature tablet 33 in a transportable canister 40 that is configured for use in the transaction facility 11, the facility 11 also including a vacuum transport tube 41 and, optionally, a main computer 42, the main computer 44 preferably having a communication link 43 to the base computer 13. The canister 40 has a conventional door 44 that opens an interior compartment 45, the compartment being used for carrying documents between users (typically customers) and the transaction facility 11, and for storing the stylus 36. Preferably the compartment 15 and the stylus 16 have complementary elements 46A and 46B of a retainer such as a hook-loop fastener affixed thereto for releasably capturing the stylus 36 when it is not in use. Preferably the canister 42 incorporates a door sensor 48 for signaling whether the door 44 is open or closed.

The transmitters, receivers, and transceivers used in the present invention are preferably devices for transmitting and/or receiving signature or other data between the remote unit and base unit via any of a variety of wireless technologies, including Bluetooth technology, cellular telephone technology, and Wi-Fi technology. Wi-Fi is the popular term for a high-frequency wireless local area network. It is also referred to as wireless fidelity or wireless networking, and can use the 802.11, 802.11a, 802.11b, or 802.11g protocols. "Wireless" as used herein means using the radio-frequency spectrum for transmitting and receiving voice, data, video and other signals for communication. The communication frequency or technology to be used for the present invention will depend on the circumstances of use, including the distance over which communication is desired, the bandwidth of data to be communicated, and the physical environment (e.g., the presence or absence of interfering signals or blocking structures).

An additional preferred feature of the remote unit 30 is a docking connector 56 for use with a docking device 26 in communication with the base unit 12 to enable wired or local communication of data between the remote unit 30 and the base unit 12 when the remote unit is docked relative to the transaction facility 11 as indicated by broken lines in FIG. 1. This arrangement allows the signature data to be transmitted to the base computer 13 using the transceivers 22 and 38, or using a communication link 27 between the docking device and the base device interface 20, depending on circumstances such as the performance of the transceivers 22 and 38, and the need, if any, to provide the signature data to the base unit 12 prior to return of the canister 40 to the transaction facility 11. It will also be understood that the communication link 27 can be the exclusive channel for communicating the signature data, such that the transceivers 22 and 38 can be low cost devices that may not be capable of quickly communicating the signature data. Further, the communication link can be a wired connection or, optionally, it can include a radio transmitter and receiver, or it can utilize infrared technology, depending on factors such as the distance and obstacles between the docking device and the base device interface. In another variation, separate counterparts of the base and remote transceivers 22 and 38 can be used for transmitting the signature data and for monitoring the proximity of the canister 40 with the transaction facility. In this variation, the transceivers monitoring proximity would have an effective range commensurate with appropriate distances that users might be authorized to transport the canister 40, but would need only low bandwidth capability. The transceivers used for signature data transfer would need higher bandwidth capability, but could operate at short range with the canister in close proximity to the transaction facility 11.

In the exemplary configuration of the remote unit 30, the remote alarm circuit 37 is implemented as a buzzer. The alarm circuit 37 can incorporate a device (not shown) that produces a flashing red "ALARM—RETURN to BASE" or similar indication. Additional devices connected to the device interface 33 include the door sensor 48, a remote microphone 50, a remote speaker 52, and a remote indicator 54 which can be a suitable LED or a device that signals "SIGN NOW," indicating that the remote unit is ready to receive signature data. Power for the electronics of the remote unit 30 is provided by suitable batteries (not shown), the batteries being preferably rechargeable by suitable means (also not shown).

The base voice interface and the remote voice interface 39 each include a digital to analog converter (DAC) and an analog to digital converter (ADC). Voice from the base unit 12 is picked up by the base microphone 19 and routed through a PC sound card or other suitable mechanism for reproducing sound of the base computer 13 (such as by a microphone and pre-amp of the transaction facility 11) and fed through the ADC of the base voice interface 24 to the base transceiver 22. Then from the remote transceiver 38, received digital voice signals are fed into the remote voice interface 39 which signals the presence of the digital voice signal to the remote computer 32 which then activates the DAC of the remote voice interface to produce a reconstituted analog voice waveform that is amplified in the remote device interface 33 and delivered to the remote speaker 52. For voice from the remote unit 30 to the base unit 12, this process is reversed. It will be understood that the operator interface 14 can include a subset only of the above-described components thereof. Also, either or both of the device interfaces 20 and 33 can be integrated with the respective computers 13 and 32.

Figure 2:
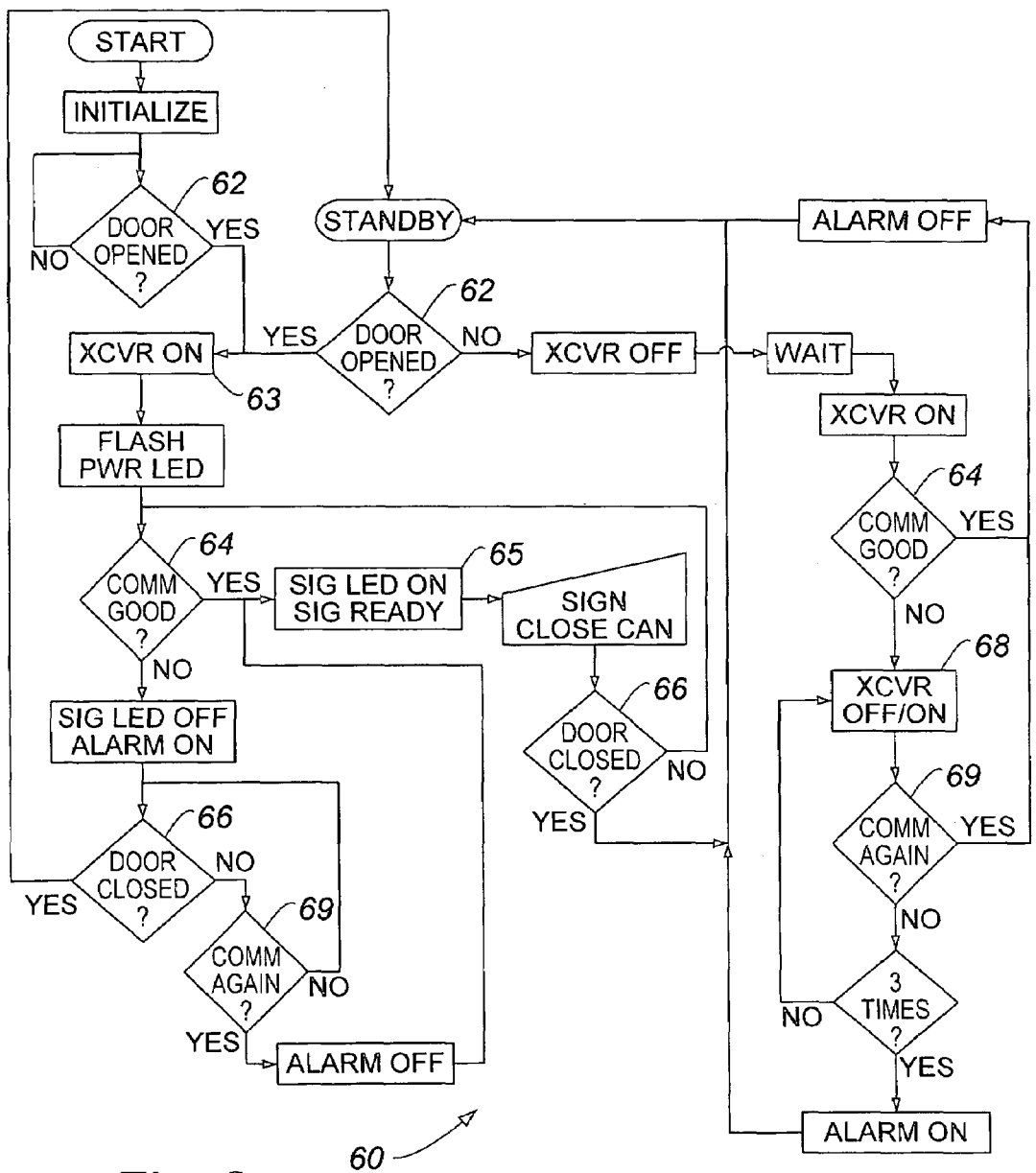
FIG. 2 is a flow chart of a computer process for signature capture and transmission from a remote unit of the system of FIG. 1.

With particular reference to FIG. 2, a remote computer process 60 with which the remote computer 32 is programmed includes, following power-up and initialization, a test door open step 62 determines whether the door 44 has been opened as indicated by the door sensor 48 or other suitable mechanism. If so, the transceiver 38 is turned on in a transceiver on step 63 and the remote LED 54 (or a separate optional power LED, not shown) is flashed. (It will be understood that some or all of the initialization can be performed following the positive result of the test door open step 62.) Then, communication with the base unit is tested in a test communication step 64, by determining whether a trigger signal of the proper form is being received from the base transceiver 22. If so, the signature tablet 34 is initialized and/or activated and the remote LED 54 is powered for signaling to the user that the tablet 34 is ready to receive the signature 35, in a ready signature step 65. As the user proceeds to provide the signature and then close the door 44, control is passed to a test door closed step 66, returning to the test communication step 64 repeatedly as long as the door 44 remains open while communication with the base unit 12 is also monitored. Signature data corresponding to the signature 35 can be communicated to the base unit 12 either during making of the signature, upon completion of the signature, or thereafter as further described below.

When the door 44 is eventually closed (while communication remains good), the remote unit 30 enters a standby condition, the remote transceiver 38 being turned off (a counterpart of the test door open step 62 being interposed for terminating the standby condition as described below, it being presumed that the door 44 is still closed). In implementations having transmission of the signature data upon completion of the signature, closure of the door 44 can signify completion of the signature, whereupon the signature data is transmitted to the base unit 12 using the transceivers 22 and 38 immediately prior to entry of the standby mode. Other methods for signifying completion of the signature include passage of a predetermined interval on the order of 5 seconds with no further signature activity by the user.

In the standby mode, after a wait interval of perhaps 15 seconds, the remote transceiver 38 is powered (momentarily) for verifying continued communication with the base unit 12, in a counterpart of the test communication step 64. If so, the standby mode maintained, control passing to the counterpart test door open step 62, further described below, the standby mode providing greatly reduced power consumption by the remote unit 30. If the counterpart test communication step 64 produces a negative result during the standby mode, the remote transceiver 38 is cycled off then on again in an interrupt transceiver step 68, and reestablishment of communication is determined in a test reconnect step 69. If not, the recycling of the remote transceiver is repeated up to two more times. If the communication is not reestablished within three cycles, the alarm is turned on, the remote unit 30 remaining in standby mode as long as the door 44 remains closed, the remote transceiver again being turned off for the wait interval, after which the counterpart test communication step 64 is repeated. In accordance with the above description, the verification of communication by the remote unit 30 can include testing whether the trigger signals are being received from the base unit 12, and further verifying that the trigger signals are characteristic of the identification signals being properly received from the remote unit by the base unit.

In the standby mode, whenever the result of either the counterpart test communication step 64 or the test reconnect step 69 is positive, the alarm is deactivated (if activated), the remote unit remaining in the standby mode until the door 44 is opened (as determined in the counterpart test door open step 62). Optionally, the remote unit 30 can signal availability of the signature data to the base unit 12, which can then or at a later time transmit a signal (such as the trigger signal having a corresponding characteristic) to the remote unit to begin downloading the signature data. In this implementation, the signal to begin downloading is typically received during the standby mode when the transceiver is deactivated for periods as long as the wait interval. To insure recognition of the signal to begin downloading, the trigger signals can be transmitted with the corresponding characteristic for longer than the wait interval or until acknowledged by the remote unit. Also, the remote transceiver can be maintained activated for sufficient time to complete transmission of the signature data, whereupon the standby mode is resumed as described above.

When the door 44 is opened during the standby mode, control is returned to the transceiver on step 63, described above, and the process for obtaining another signature is repeated as described above. However, when the result of the test communication step 64 (prior to the ready signature step 65) is negative, the remote LED is turned off (if powered) and the alarm is activated, control passing to a counterpart of the test door closed step 66. If the door 44 remains open, control passes to a counterpart of the test reconnect step 69, the alarm remaining activated while the counterpart steps 66 and 69 are repeated. If the door is closed while the alarm is on, the remote unit is placed in the standby mode for monitoring possible reestablishment of communication with the base unit 12. If communication is reestablished before the door 44 is closed, the alarm is deactivated and control is passed (or returned) to the ready signature step 65. Thus the remote unit 30 provides for capturing the user's signature 35 while communication with the base unit 12 is maintained, activating the alarm when communication is interrupted, and deactivating the alarm when communication is restored, using the standby condition to conserve transceiver power when the door 44 is closed, and when the alarm is activated.

Figure 3:
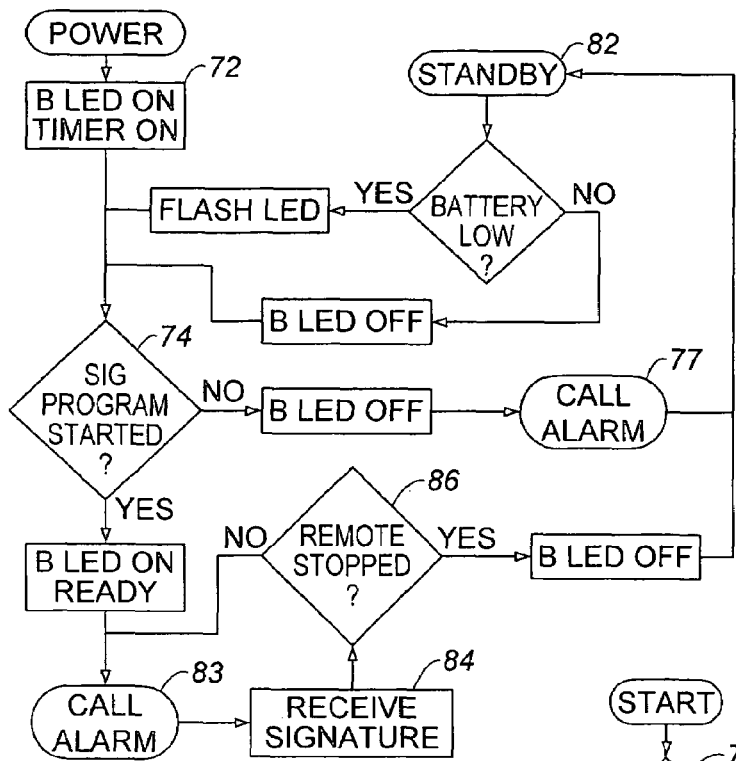
FIG. 3 is a flow chart of a computer process for receiving the signature at a base unit portion of the system of FIG. 1.
Figure 4:
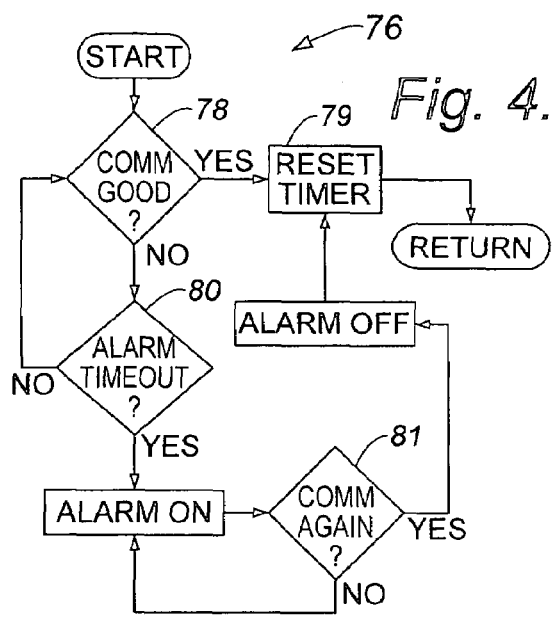
FIG. 4 is a flow chart of an alarm service portion of the process of FIG. 3.

With particular reference to FIGS. 3 and 4, a base computer process 70 with which the base computer is programmed includes, following application of power, an initialize step 72 is performed in which the base indicator 25 is activated and a base alarm timer is set and activated. Then a determination of whether signature management software of the signature system has been started (ready to accept a signature) is performed in a test ready step 74. Typically, the signature management software, which can implement features described in the above-referenced '955 patent, is started by mouse-clicking on a start button being displayed on the screen display 15. This step makes the base unit ready to accept a signature whether or not the remote unit is ready to accept one. If the software is not started, the base indicator is deactivated and an alarm service routine 76 is invoked in a call alarm step 77. (The service routine 76 is shown as a subroutine for convenience, in that separate portions of the process 70 incorporate the same steps.)

In one embodiment, the remote controller is operative for receiving transaction or other data when the remote unit is in communication with the base unit. The remote controller activates a remote indicator that the signature tablet or other device is ready to receive and/or send data, such as signature data. The indicator may be, for example, an LED or other visual message or display or an audible alarm or message.

In the alarm service routine 76, a test communication step 78 first determines whether the identification signals are being properly received from the remote unit 30; if so, the base alarm timer is reset in a reset timer step 79 and control is returned to the calling location of the process 70. If the communication link is found not to be good, a test timeout step 80 determines whether this condition has persisted beyond a predetermined interval, typically 45 seconds as discussed further below, the base alarm circuit 23 is activated; otherwise, control is returned to the test communication step 78. Following activation of the base alarm circuit 23, a test reconnect step 81 determines whether there has been a resumption of communications. If so, the base alarm circuit 23 is deactivated and control is returned to the reset timer step 79; otherwise, the test reconnect step 81 is repeated with the alarm on until such time as communication with the remote unit is reestablished.

Upon return to the call alarm step 77 location (which occurs only when there is good communication with the remote unit 30), the base computer process 70 enters a standby condition 82, the base indicator 25 being turned off.

Upon a positive result from the test ready step 74, the base indicator 25 is activated (if it had been deactivated previously) and the alarm service routine 76 is invoked in a call alarm step 83, and upon a successful return (communication good), the signature data is downloaded in a receive signature step 84. As described above, the signature data can be received as it is generated or following completion of the signature 35, control being passed to a test stop step 86 for determining whether the signature management software has been terminated (such as by mouse-clicking on a displayed stop button), in which case the base indicator 25 is deactivated and the standby condition 82 is entered; otherwise, control is returned to the call alarm step 83 in preparation for receiving another set of signature data. It will also be understood that the receive signature step 84 can be implemented for receiving a portion only of the signature data, the step 84 being repeated as needed for receiving a full set of the signature data.

As described above, the base alarm timer has an exemplary timeout interval of 45 seconds. This is consistent with the standby mode of the remote unit 30 in which the remote transceiver 38 is activated at intervals of 15 seconds for from approximately 0.25 second to approximately 1.5 seconds to verify communication with the base unit 12. The 15 second intervals advantageously facilitates providing battery power to permit effective use of the remote unit 30 for at least one day, while also limiting the distance that the remote unit could be taken away from effective communications range before the alarm would be activated. An additional consideration is that the metal used in typical implementations of the transport tube 41 acts as a shield to prevent communication with the base unit 12 for perhaps 15 seconds. Consequently, it is preferred that there be no activation of either the base alarm circuit 23 or the remote alarm circuit 37 if there is no communication for the first 15 seconds. A further consideration is that if the base unit timer starts right after a communication, it will run for another 15 seconds before the next communication. The remote transceiver is activated at the 15 second interval; if it sees no communication, and this is verified in the three cycles of the test reconnect step 69 of the remote computer process of FIG. 2, up to an additional 1.5 seconds can elapse, a total of 19.5 seconds. Allowance is made for this sequence to be completed twice, taking nearly 40 seconds, and further allowance for the time of communication which can vary depending on distance. The above considerations assume that the canister 40 is not actually being used. If the door 44 is opened when the canister 40 is out of range, the remote alarm circuit 37 is activated within 2 or 3 seconds notwithstanding the 45 second delay in activation of the base alarm circuit 23. This is because the remote computer process 60 executes the test communication step 64 substantially immediately following detection of initial opening of the door 44 at the test door open step 62 following power-up. If the canister 40 is out of range, the identification signals from the remote unit 30 are interrupted, and the trigger signals consequently are not toggled or otherwise characteristic of good communications between the base and remote units.

Thus the base unit 12 produces the trigger signals as a pulse train that is kept alive by reflection from the remote unit 30 back to the base unit, and both units activate respective alarms in response to interruption of the communication and also reset the alarms in response to restoration of communication. The base computer 13 can communicate with multiple remote units 30 using corresponding counterparts of the base device interface 20 and base transceiver 22, each pair of transceivers 22 and 38 operating on frequencies (channels) different than those of other such pairs.

In an alternative embodiment, in which the range of a communication link between the base unit and the remote unit extends beyond a distance which a proprietor might want a user of the remote unit to take it, the remote unit might include a global positioning system (GPS) and be configured to transmit location data from a GPS system to the base unit. GPS is a system involving satellites which transmit signals receivable by a computer on earth. The computer can determine its latitude and longitude by computing the time difference for signals from different satellites to reach the receiver. In such an embodiment, the test communication step 64 could involve the sending of location data by the remote unit to the base unit. The base alarm circuit can be activated when the base unit receives location data indicating that the remote unit has been taken beyond a predetermined distance from a particular location, which can correspond to the location of the base unit. Alternatively or in addition, a remote alarm circuit can be activated in the remote unit by the remote computer receiving such location data from a GPS system in the housing. The remote alarm circuit would activate an indicator, such as a message light, text message, or buzzer, to alert a user of the remote unit that its position is beyond the predetermined distance. In such an embodiment, the communications technology chosen would be one with an appropriate range, such as a cellular phone-based system.

In the foregoing embodiments of the present invention and in those described below, other transaction data besides signature data can be captured and transmitted (in either direction) between the base and remote units. Such data can include, for example, fingerprint data, voiceprint data, data in magnetic form, photographic data (such as from a digital camera), alphanumeric data (such as a personal identification number, entered via a keypad or touch screen), and data stored in a chip. The data in magnetic form can be on a magnetic strip, as can be found conventionally on plastic cards such as credit cards, and can be read via a card reader. Data stored in a chip can be captured from a "smart card," in which the chip is carried on or embedded in a plastic card, as is known to the art.

Figure 5:
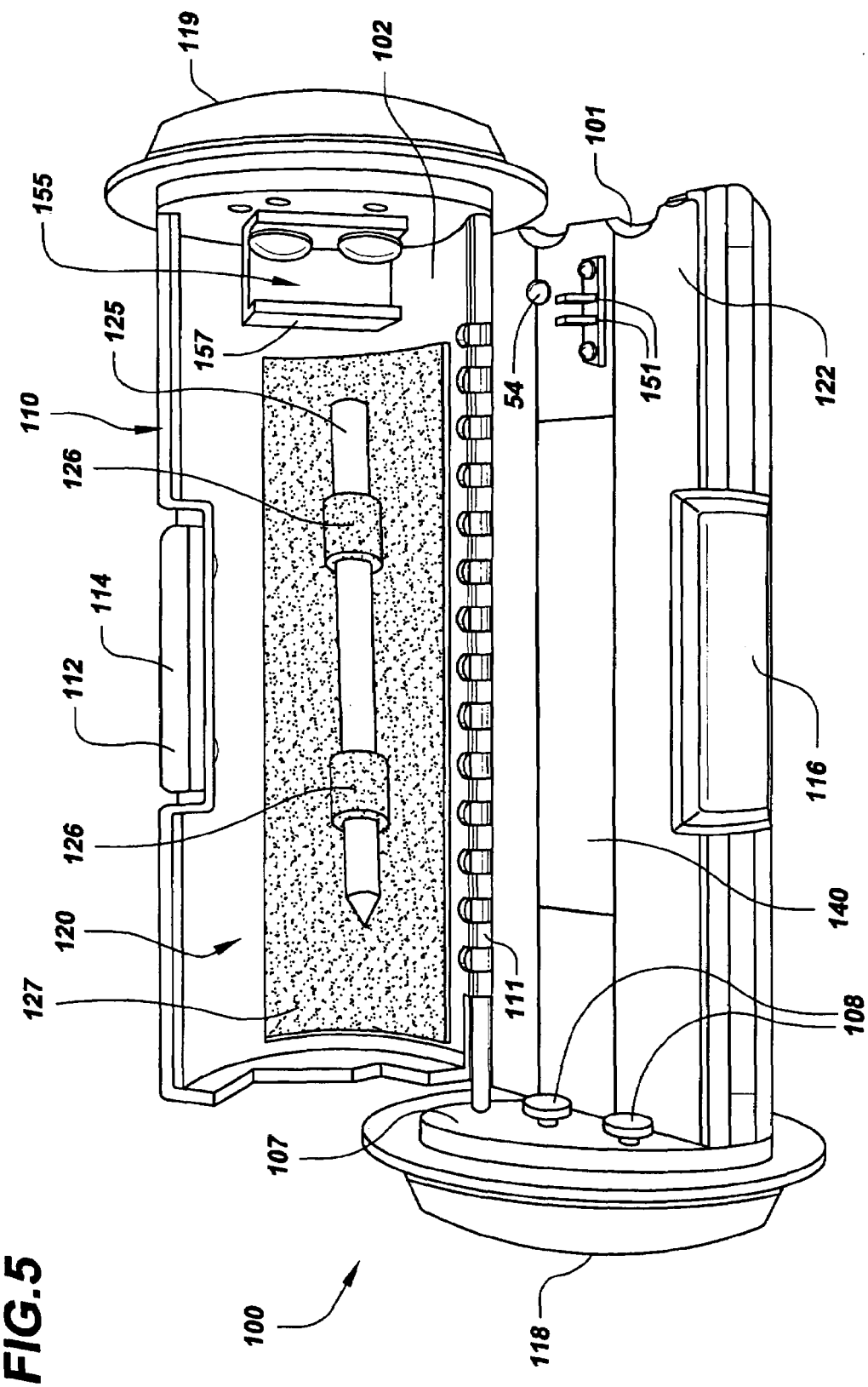
FIG. 5 is a side view showing an embodiment of the transport housing of the present invention in an open position.
Figure 7:
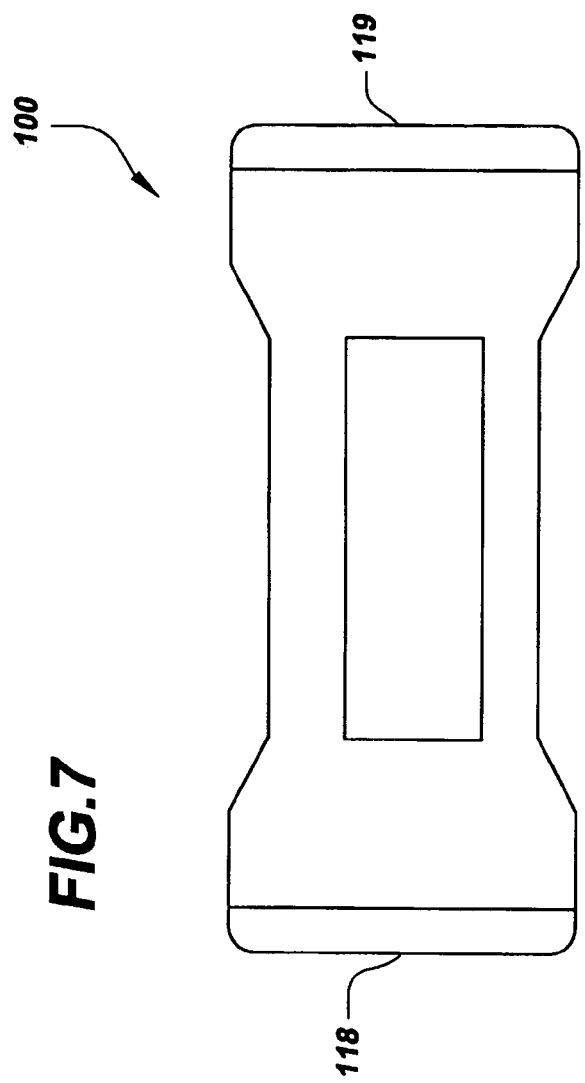
FIG. 7 is a side view of the exterior of the housing shown in FIG. 5.
Figure 6:
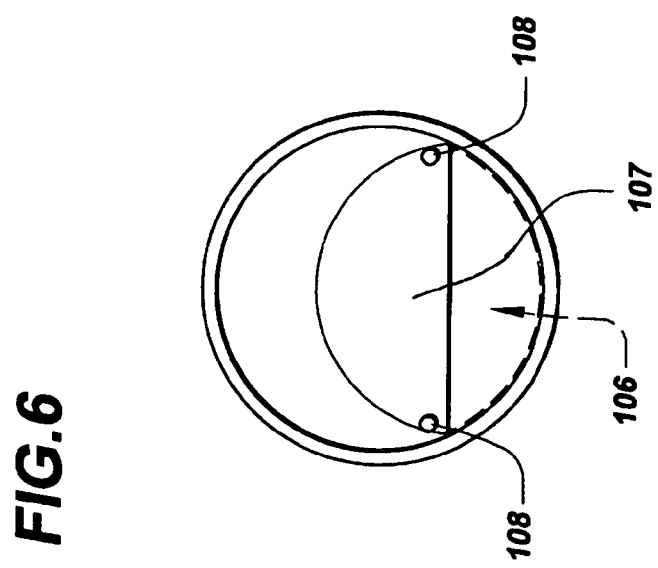
FIG. 6 shows the interior surface of the compartment where the battery housing is located in the embodiment of the invention shown in FIG. 5.
Figure 10:
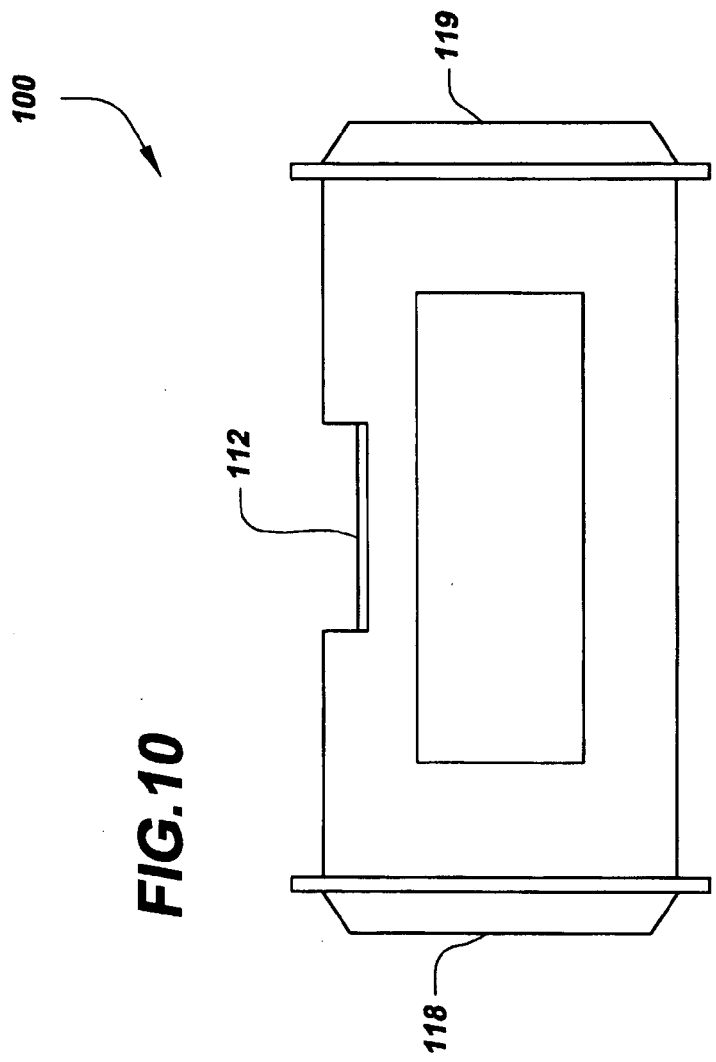
FIG. 10 shows the interior surface of the compartment where the battery housing is located in the embodiment of the invention shown in FIG. 8.
Figure 9:
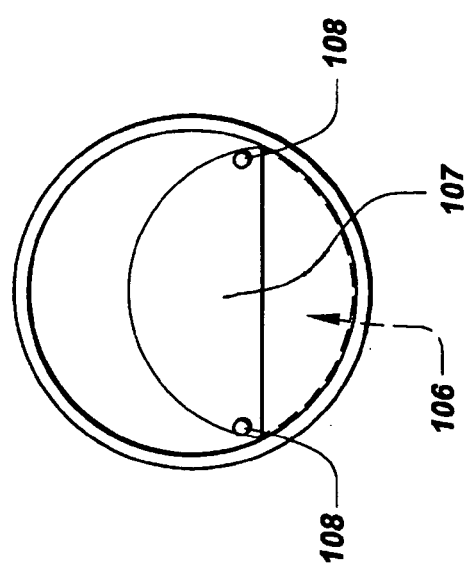
FIG. 9 is a side view of the exterior of the housing shown in FIG. 8.

FIGS. 5-10 exemplify further embodiments of the present invention. In these embodiments, the mechanical transport system comprises a housing 100 having an exterior surface 101 and an interior surface 102. Inside the housing 100 is a compartment 120, which can be formed at least partially from the interior surface 102 of the housing 100, as shown in FIGS. 5 and 8. Alternatively, the compartment 120 can comprise a separate enclosed structure (not shown) within the housing 100. The compartment 120 and housing 100 are preferably made of a plastic material such as polycarbonate, ABS (a class of plastics based on acrylonitrile-butadiene-styrene copolymers) or Ultem (polyetherimide), but can also be made of other materials, such as metal, composite material, or synthetic fiber such as Kevlar. The housing 100 and compartment 120 are preferably adapted to be impact resistant, i.e. to resist cracking, breaking, and other damage under intensive use or foreseeable misuse (such as being dropped from a counter or car window to the ground by a user), and materials which impart this characteristic are preferably chosen.

The compartment 120 can be adapted in one embodiment to transport prescriptions and medication for an individual. Such an embodiment would be of particular use in a pharmacy. The intended recipient of the medication would be able to verify his or her identity via a signature tablet or other device for capturing data as described herein. The compartment 120 in another embodiment can be adapted to carry financial instruments such as checks, currency, receipts, or other documents. In this and other embodiments, it is advantageous for the compartment to be adapted to carry a stylus 125, such as a pen, for inputting information into a signature tablet 140 or other electronic device.

When a stylus 125 is included in the compartment 120, it is preferably reversibly attached to an interior surface of the compartment 120. In the embodiments shown in FIGS. 5 and 8, the interior surface of the compartment 120 has attached thereto a first piece of hook-and-loop material 127 (such as Velcro brand hook-and-loop material, made by Velcro Industries B.V.) and the stylus 125 has attached thereto a corresponding second piece of hook-and-loop material 126 to which the first piece 127 becomes reversibly bound when brought into contact with the second piece 126. Other systems for reversibly binding the stylus 125 to the compartment can also be used. In an alternative embodiment (not shown), the compartment 120 further comprises a foam material which "pinches" or otherwise generally physically contacts and restrains the stylus 125 and thereby substantially prevents movement of the stylus 125 when the transport housing 100 is in a closed position and is being moved. Means for preventing movement of the stylus 125 are particularly important in embodiments in which the transport housing is moved rapidly, such as through a pneumatic tube, so that the stylus 125 does not impact the interior of the compartment 120 or the electronic signature tablet 140 or other device, thereby possibly damaging it. Such embodiments are also of more general applicability in maintaining a stylus 125 within the compartment 120. It has been found to be disadvantageous to tether a stylus 125 to the compartment 120, such as via a cord, primarily for the reason that such a cord may get caught in the door 110 when it is closed and interfere with such closure, though the use of a retractable cord in the present invention is contemplated.

Access to the compartment 120 is provided through a door 110. In the embodiments shown in FIGS. 5 and 8, the door 110 is formed from an integral portion of the housing 100. In an alternative embodiment (not shown), the door can be a separate structural piece. The door 110 shown in FIGS. 5 and 8 is attached to the housing 100 by means of a hinge 111, so that the door 110 can swing relative to the housing 100. In the case of the embodiments shown in FIGS. 5 and 8, the hinge 111 allows the door 110 to swing relative to the remainder of the housing 100 so as to move the door from a closed to an open position. In a different embodiment (not shown), the door slidably engages the housing 100 and slides from a closed to an open position, such as along rails, in order to provide access to the compartment 120.

In the embodiments shown in FIGS. 5 and 8, the door 110 opens so as to present a flat interior surface 122 of the compartment 120. Such a flat surface 122 facilitates the input of data into a signature tablet 140 or other device attached to or associated with the housing 100. In the depicted embodiments, the surface of the signature tablet 140 comprises a portion of the flat interior surface 122 of the compartment 120.

In the closed position, the door 110 in this embodiment is secured to the remainder of the housing 100 by means of a fastener 112. The fastener 112 can be a latch 114, i.e. a catch for fastening a door, which cooperates with a receiving structure 116 formed in or attached to the housing 100. The fastener 112 can be integrally formed with the housing 100 or can be a separate piece attached to the housing 100.

The fastener 112 cooperates with the compartment 120 and/or with the housing 100 when the door 110 is closed so as to maintain the door 110 in a closed position until the fastener 112 is actuated so as to allow the door 110 to open. In the closed position, the door 110 preferably is adapted to maintain a watertight and/or airtight seal with the compartment 120. As used herein "watertight" refers to a container which provides a degree of protection against windblown dust and rain, splashing water, and, preferably, hose directed water. In a preferred embodiment, the housing and door prevent the ingress of water into the housing when it is exposed to a stream of water from a 1 inch diameter nozzle at 65 gallons per minute at a distance of 10-12 feet for 30 seconds, more preferably for one minute, and even more preferably for 5 minutes. A gasket (not shown) can be conventionally used to accomplish this. This is advantageous in any application in which the transport housing is to be exposed to outdoor weather conditions, including exposure to moisture.

The housing 100 can also further include a battery (not shown) for providing power to an attached or enclosed device, such as a device for capturing electronic data 140. The battery can be contained within a housing of the device itself, or alternatively can be contained in a battery housing 106. The battery housing 106 is preferably enclosed so as to protect it from environmental damage, such as from moisture, as well as from possible tampering by a user. In the embodiment shown in FIGS. 5, 6, 8 and 9, the battery housing 106 is accessible from the interior of the compartment 120 through a battery housing door 107 which is reversibly secured to an interior surface 122 of the compartment 120, in this case by means of screws 108.

The compartment 120 of the housing 100 of the present invention further contains a device for capturing data 140 and for converting such data into electronic form. This device 140 is located in the compartment 120, and in the embodiment depicted in FIGS. 5 and 8 is an electronic signature tablet. For devices 140 adapted to capture signature data or alphanumeric data entered via a touch screen or touch pad, it is preferable for the surface of the device to be flat, as shown in FIGS. 5 and 8. A variety of devices for capturing electronic data, and in particular electronic data which identifies an individual user (including a corporation or other organization), can be used. For example, an electronic stylus such as one of those disclosed in U.S. Pat. Nos. 6,188,392 and 6,195,446 and in U.S. Patent Application Publication No. 2003/0089533 (the disclosures of which are hereby incorporated by reference) can be used together with or in place of an electronic signature tablet. Another type of device which might be used in connection with the present invention is an electronic seal as described in U.S. Pat. Nos. 6,640,007 and 5,948,103, the disclosures of which are also hereby incorporated by reference. Devices for capturing biometric or other forms of individually identifying data can be used alternatively or in addition. For example, U.S. Pat. Nos. 6,307,956, 6,208,264, 6,539,101, and 6,591,002 and in U.S. Patent Application Publication No. 2003/0037004, the specifications of which are hereby incorporated by reference, relate to the capture of biometric data, including fingerprint and voiceprint data.

One preferred device for capturing biometric data in electronic form is the IDGem device, sold by Topaz Systems, Inc. (650 Cochran St., Suite 6, Simi Valley, Calif. 93065). This device combines a digital signature pad, finger print identification device, and a digital camera for capturing a photographic image of the head of a user of the device. As used herein, the phrase capturing data in electronic form (or similar language) refers to the recording and/or the transmission of analog or digital electronic data which signifies or represents data which may originally not be in electronic form, such as fingerprint, voiceprint, breathalyzer, or signature data.

The device 140 may be fixedly secured to the compartment 120, as shown in FIGS. 5 and 8, or alternatively may be removably secured, such as through mechanical clips or restraints, fasteners (including hook-and-loop fasteners), or the use of a compartment configured to retain the device 140. The device 140 may alternatively be fixedly or removably secured to an exterior surface 101 of the housing 100. FIG. 1 shows such an embodiment in which the device is fixedly secured to the exterior of the housing.

The transport system of the present invention preferably also has a memory associated therewith for storing data which is inputted into the device 140. The memory associated with the transport housing of the invention may be contained in the housing itself, for example in a computer associated with a signature tablet. Alternatively the memory may be contained in a stylus, as for example disclosed in U.S. Pat. Nos. 6,188,392 and 6,195,446 and in U.S. Patent Application No. 2003/0089533. Alternatively, the device 140 may contain no permanent memory, and may transmit data to a second device (such as a personal computer) which can store the data in a permanent form. Such a device 140 would advantageously contain a buffer to temporarily store electronic data. Alternatively or in addition, such a buffer might be contained in the device for transmitting data to the second device having a more permanent memory. Buffer data can stored, for example, in RAM (random access memory) which is erased when power to the device is turned off.

In another embodiment, the device for capturing data 140 in electronic form and/or the second device can be adapted to detect data which indicates that a user of the device is under duress. For example, the device 140 can receive voiceprint or signature data and analyze it to determine whether the data matches reference voiceprint or signature data on file, or whether it differs from such reference data in a manner which indicates stress or duress. If the data indicate that the individual providing such data may be under duress, the device 140 can transmit a signal and trigger an alert. The alert can be used, for example, to notify security or law enforcement personnel that the transaction taking place may not be voluntary. In an alternative embodiment, breathalyzer data or other data indicative of the physical state of an individual can be gathered by the device 140. Data indicating that a user has imbibed a predetermined amount of alcohol, for example, can trigger an alert and send a signal to alert law enforcement personnel.

The transport system of the present invention further includes a communications device in the remote unit for communicating data from the device for capturing data 140 to a second device, which can be a base unit as described previously. The communications device is preferably a wireless transceiver, though in some embodiments can simply be a transmitter to provide only one-way communication. The particular wireless technology to be used depends on the environment in which the transport system is to be used, as described above. In some applications, short range communication Bluetooth technology may be appropriate. Chips making use of Bluetooth technology, such as BCM2033 from Broadcom of Irvine, Calif., often have an effective range of approximately 30 feet, though longer ranges are also possible. Longer range communication between the communications device and the second device can be provided by different wireless frequencies and technologies. In one embodiment the communications device is in communication with a wireless network. It is understood that the communications device can be incorporated in the same physical housing as the device 140, but in the alternative can be contained in another compartment within the housing 100 or the compartment 120 of the invention and in communication with the device 140.

The second device, in communication with the device for capturing data 140, includes a receiver or transceiver for receiving electronic data from the device 140. Preferably, the second device comprises a memory for storing data from the device for capturing data 140 in the remote unit. The second device can be a computer, such as a personal computer.

In an alternative embodiment, the communications device communicates with the second device through a docking station or other physical or local connection. For example, the communications device can communicate through an I/O port, a USB hub, or a serial port.

As described above, the transport housing 100 can further comprise a mechanism for signaling an open or closed condition of the door 110, and/or for signaling the start or end of a standby mode of a device 140 in the housing 100. In the embodiments shown in FIGS. 5 and 8, the mechanism comprises an optical interrupter switch. This switch comprises a pair of posts 151 attached to a surface 122 of the compartment 120. The posts 151 include an infrared LED coupled with a sensor packaged in a plastic housing. For example, a phototransistor optical interrupter switch such as one of those made by Fairchild Semiconductor Corporation (82 Running Hill Road, South Portland, Me. 04106) can be used (e.g., models CNY29, H21A1, H21A2 and H21A3). Such interrupters consist of a gallium arsenide infrared emitting diode coupled with a silicon phototransistor in a plastic housing. The gap between the posts can be, e.g., in the range of from about 1 mm to 5 mm. When an opaque material is inserted between the posts and breaks the light beam, the impedance of the phototransistor increases, and the output of the switch is thereby changed from an "ON" to an "OFF" state.

In the embodiments shown in FIGS. 5 and 8, the opaque material for breaking the light beam of the switch is a generally U-shaped member 155 attached to the door 110. The U-shaped member can be continuously curved or can have one or more angles (as shown in the embodiments of FIGS. 5 and 8). When the door 110 is in a placed in a closed position, a lip 157 of the U-shaped member 155 becomes inserted between the posts 151 and breaks the beam of light between them. The posts are in communication with a remote computer of the remote unit, and in one embodiment the interruption of the light beam of the optical interrupter switch signals the remote computer to enter into a standby mode (described in detail previously). The opening of the door 110 moves the lip 157 of the U-shaped member 155, allowing light to pass between the posts and thereby changing the state of the optical interrupter switch. In this embodiment this can then signal the remote computer to exit the standby mode. In an alternative embodiment (not shown), the U-shaped member 155 can be attached to the compartment 120 or housing 100, and the posts 151 correspondingly attached to the door 110.

The exterior of the transport housing 100 can be any of a number of configurations. Such configurations must be such as to provide for a compartment 120 containing a device for capturing data in electronic form 140 and any stylus 125 or other device which might be required for actuating the device 140. The configuration also preferably provides for a compartment 120 of a dimension capable of containing other items which can be transported to or by a user. In the example depicted in FIGS. 5-10, the compartment is adapted to contain financial instruments, such as checks, currency, receipts, or other paper documents, and is in particular adapted to be placed in a pneumatic or vacuum transport tube. This embodiment can be employed, for example, to enable transactions at drive-up kiosks or windows of financial institutions or retail shops. Other configurations are also contemplated for the transport housing 100.

Security for the transport housing and/or for the data collected by the device 140 can be provided in a number of ways. In one aspect, data security can be provided by using a unique system identification number that is programmed into each base unit 12 or group of base units in which each pair of transceivers has a different channel number, in order to assure that the communication link is secure. Electronic data can also be encrypted, in ways known to the art, to provide electronic security. Physical security can be provided to the transport housing by, for example, providing a physical lock on the compartment door. The lock can be chosen from any of a number of conventional locks, such as one opened by a physical key, or via an electronic interface, such as a keypad or magnetic card reader.

The spirit and scope of the appended claims should not necessarily be limited to the description of the preferred versions contained herein.

What is claimed is:

1. A transport system comprising a housing adapted to be transported through a pneumatic tube, the housing having an exterior surface and an interior surface, wherein the housing comprises:
    a. a compartment inside the housing;
    b. a door attached to the housing which provides access to the compartment;
    c. a device for capturing data in electronic form in said compartment;
    d. a wireless communications device for communicating data from the device for capturing data to a second device; and
    e. a memory for storing said data,
    wherein the data is selected from the group consisting of fingerprint data, signature data, voiceprint data, data in magnetic form, digital photographic data, alphanumeric data, data from a breathalyzer, and data stored in a smart card.

2. The transport system of claim 1, wherein the device for capturing data in electronic form is adapted to detect data which indicates that a user of the device is under duress.

3. The transport system of claim 1, further comprising a receiver.

4. The transport system of claim 1, further comprising a transceiver.

5. The transport system of claim 1, wherein the memory is contained in the device for capturing data.

6. The transport system of claim 1, wherein the memory is contained in a stylus.

7. The transport system of claim 1, wherein the memory is contained in the wireless communications device.

8. The transport system of claim 1, wherein the memory is a storage buffer.

9. The transport system of claim 1, wherein the door is an integral part of the housing.

10. The transport system of claim 1, wherein the compartment is adapted to transport medication for an individual.

11. The transport system of claim 1, further comprising a stylus, wherein the compartment is adapted to carry a stylus.

12. The transport system of claim 11, wherein the stylus is reversibly attached to a surface of the compartment.

13. The transport system of claim 11, wherein the compartment further comprises a foam material adapted to restrain the stylus when the door is in a closed position.

14. The transport system of claim 1, wherein the device for capturing data is fixedly attached to the compartment.

15. The transport system of claim 1, wherein the device for capturing data is reversibly attached to the compartment.

16. The transport system of claim 1, wherein the data is alphanumeric data and the device for capturing data in electronic form is selected from the group consisting of a keypad and a touch screen.

17. A transport system comprising:
    (1) a stylus; and
    (2) a housing having an exterior surface and an interior surface, wherein the housing comprises:
        a. a compartment adapted to carry the stylus inside the housing,
        wherein an interior surface of the compartment has attached thereto a first piece of hook-and-loop material and the stylus has attached thereto a corresponding second piece of hook-and-loop material to which the first piece becomes reversibly bound when brought into contact with the second piece;
        b. a door attached to the housing which provides access to the compartment;

c. a device for capturing data in electronic form in said compartment;
d. a wireless communications device for communicating data from the device for capturing data to a second device; and
e. a memory for storing said data, wherein the data is selected from the group consisting of fingerprint data, signature data, voiceprint data, data in magnetic form, digital photographic data, alphanumeric data, data from a breathalyzer, and data stored in a smart card.

18. A transport system comprising:
(1) a global positioning system; and
(2) a housing, the housing having an exterior surface and an interior surface, wherein the housing comprises:
  a. a compartment inside the housing;
  b. a door attached to the housing which provides access to the compartment;
  c. a device for capturing data in electronic form in said compartment;
  d. a wireless communications device for communicating data from the device for capturing data to a second device; and
  e. a memory for storing said data,
  wherein the data is selected from the group consisting of fingerprint data, signature data, voiceprint data, data in magnetic form, digital photographic data, alphanumeric data, data from a breathalyzer, and data stored in a smart card.

19. The transport system of claim 18, wherein the global positioning system provides location data to a computer in the housing, and wherein a remote alarm circuit is activated by the remote computer when the location data indicates that the housing is beyond a predetermined distance from a predetermined location.

20. A transport system comprising a housing, the housing having an exterior surface and an interior surface, wherein the housing comprises:
  a. a compartment inside the housing;
  b. a door attached to the housing which provides access to the compartment;
  c. an optical switch, said switch comprising:
    (i) a pair of posts attached to a surface of the compartment, wherein one of said posts includes an infrared emitting diode and the other of said posts includes a sensor, and wherein a beam of infrared light is transmitted from the diode to the sensor; and
    (ii) an opaque material attached to the door, wherein when the door is in a closed position the opaque material is positioned in between the pair of posts and blocks the beam of infrared light
  d. a device for capturing data in electronic form in said compartment;
  e. a wireless communications device for communicating data from the device for capturing data to a second device; and
  f. a memory for storing said data,
  wherein the data is selected from the group consisting of fingerprint data, signature data, voiceprint data, data in magnetic form, digital photographic data, alphanumeric data, data from a breathalyzer, and data stored in a smart card.

* * * * *